Sept. 15, 1959        P. WEISSHUHN        2,903,947

METHOD AND APPARATUS FOR MANUFACTURING BAGS

Filed June 14, 1956        3 Sheets-Sheet 1

INVENTOR.
Peter Weisshuhn
BY
Michael S. Striker
agt.

INVENTOR.
Peter Weisshuhn
BY
Michael S. Striker

United States Patent Office 2,903,947
Patented Sept. 15, 1959

2,903,947

METHOD AND APPARATUS FOR MANUFACTURING BAGS

Peter Weisshuhn, Pointe Claire, Quebec, Canada

Application June 14, 1956, Serial No. 591,410

Claims priority, application Germany June 14, 1955

4 Claims. (Cl. 93—35)

The present invention relates to a method and apparatus for manufacturing bags.

More particularly, the present invention relates to a method and apparatus for manufacturing two-seam bags made of a foldable material, as, for example, paper, foil, cellophane or the like.

It is an object of the present invention to provide a method and apparatus whereby bags made of foldable material may rapidly be mass-produced at very low cost.

It is another object of the present invention to provide a method and apparatus whereby bags made of foldable material may be produced automatically with a minimum of supervision.

With the above objects in view, the present invention mainly consists in a method of making bags of foldable material which comprises the steps of providing a strip having at its opposite edge portions notches which leave between themselves flap portions, folding each notched edge portion onto one face of the strip, folding each of the flap portions back onto the previously folded corresponding edge portion, applying an adhesive to the exposed faces of the folded flap portions of the strip, cutting the folded strip into individual sections each of which contains a pair of flap portions each of which extends from the region of one end of the respective section to approximately the midpoint thereof, and folding each section about a line transverse to the edge portions and passing through the region of the midpoint of each section so that that part of each edge portion which is not coextensive with any flap portions is in face-to-face relationship with and adheres to the flap portion associated with the remainder of such edge portion.

The present invention further consists in that improvement in an apparatus for making bags of foldable material which includes means for moving along a predetermined work path an elongated strip of foldable material formed at its opposite edge portions with notches which leave between themselves flap portions, first folding means arranged along the work path for folding the notched edge portions of the moving strip onto one face thereof, and second folding means also arranged along the work path and, in the direction of the moving strip, behind the first folding means for folding the flap portions of the moving strip back onto the previously folded corresponding edge portion of the strip.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
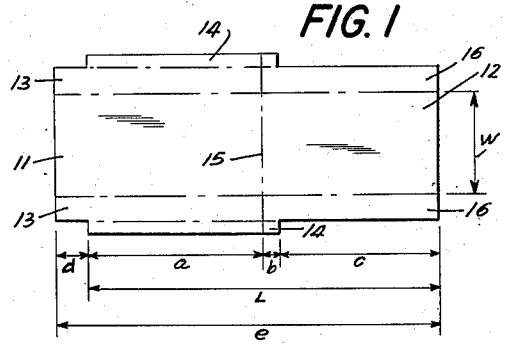
Figs. 1–4 are plan views of a bag capable of being produced by the method and apparatus according to the present invention, the bag being shown in different folded and unfolded conditions.

Referring now to the drawings and to Fig. 1 thereof in particular, there is shown a bag which may be produced according to the present invention, the bag being represented in its completely unfolded condition. The bag is formed from a substantially rectangular sheet of foldable material, as, for example, paper, foil, cellophane or the like, and includes a central portion approximately half of which is indicated at 11 and the remainder at 12, a pair of inner flap portions approximately half of each of which is indicated at 13 and the remainder at 16, and a pair of substantially rectangular outer flap portions each of which is indicated at 14. The inner flap portions are on opposite sides of the central portion and extend throughout its entire length, whereas each of the outer flap portions 14 extends from the region of one end of the sheet beyond the midpoint thereof. The width of the central portion is shown as $w$.

Figure 5:
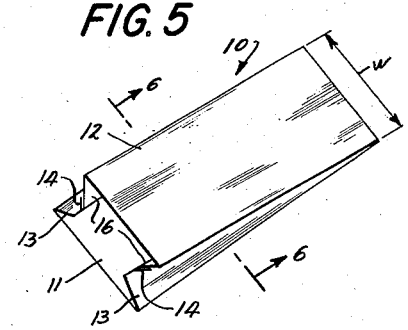
Fig. 5 is a perspective view of a finished bag produced according to the present invention.
Figure 2:
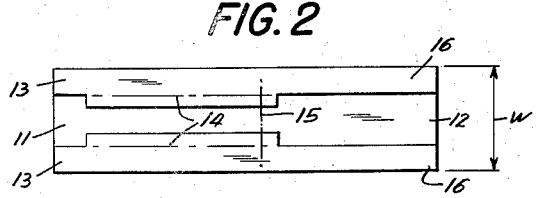
Figure 6:
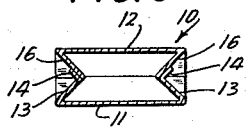
Fig. 6 is a sectional view taken along line 6—6 of Fig. 5.
Figure 3:
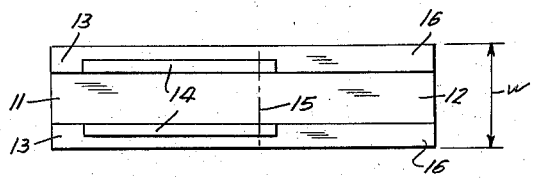
Figure 4:
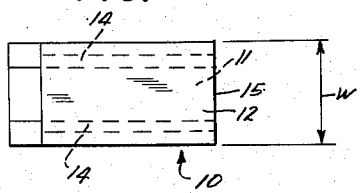

Each of the inner flap portions, together with its associated outer flap portion, is folded upon the central portion (Fig. 2) and each outer flap portion is folded back upon its associated inner flap portion (Fig. 3). A suitable glue or other adhesive is applied to the exposed faces of the flap portions 14, or at least to that part of each flap portion which is indicated by $a$. The sheet material together with the folded flaps is folded along a transverse fold line 15 so that the bag then assumes the form shown in plan view in Fig. 4 and in perspective in Fig. 5. Thus, the part 11 of the central portion constitutes one broad wall of the bag whereas the part 12 constitutes the opposite broad wall, the width of each walls being $w$. Also, each flap portion 13 together with one of the flap portions 16 forms one of the side walls of the bag, each flap portion 14 providing the seam between a set of flap portions 13 and 16.

As may readily be seen from the drawings, the interrelation between the distances $a$, $b$ and $c$ is such that $$a=b+c$$

so that when the sheet is folded along the line 15, the free edge of the sheet (as viewed in Figs. 1–4) is substantially in registration with the left edges of the flap portions 14. Thus, that portion of the length of the sheet from which the bag per se is made is indicated at $L$, and the transverse fold line 15 passes through the region of the midpoint of this length.

It has been found that for commercial and other purposes, the provision of an end flap is desirable. It has also been found, in practice, that the manufacture of a bag according to the present invention is facilitated when the length of the outer flap portions 14 is equal to one half of the entire length of the sheet from which the bag is made, i.e., when $$a+b=\tfrac{1}{2}l.$$

Thus, in the illustrated bag (Figs. 1–6), the actual length $l$ of the sheet is greater than L, so that one of the broad sides of the bag, namely, the side indicated at 11, is formed with an end flap the length of which is indicated by the distance $d$. As may readily be computed, $$d=2b$$

Figure 7:
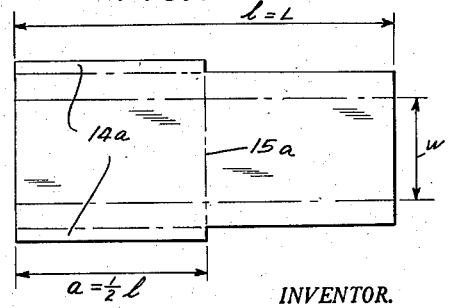
Fig. 7 is a plan view of a modified embodiment of a bag produced according to the present invention, the bag being shown in its unfolded condition.

It will be understood, however, that insofar as the bag itself is concerned, the absence or presence of an end flap is of no consequence. Thus, if it is desired to produce a bag without any end flap, the sheet from which the bag is formed may have the configuration shown in Fig. 7 wherein $l$ equals L, wherein $a$ equals $\tfrac{1}{2}l$, and wherein $b$ and $d$ each equal zero. Thus, the left edges of the outer flap portions 14a are in registration with the left edge of the sheet, the length of the flap portions 14a is equal to one half of the length of the sheet, and the fold line 15a is in registration with the right edges of the flap portions 14a.

Figure 8:
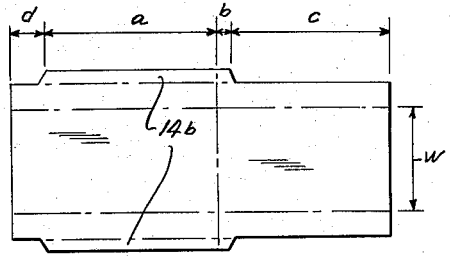
Fig. 8 is a plan view of another modified embodiment of a bag produced according to the present invention, the bag being shown in its unfolded condition.

The bag illustrated in Fig. 8 differs from the previously described ones only in that the outer flap portions 14b are of substantially trapezoidal, rather than rectangular, configuration, the manner of folding the bag remaining the same.

The above-described bags form the subject of copending application Serial No. 591,409 filed June 14, 1956, now abandoned.

Figure 9:
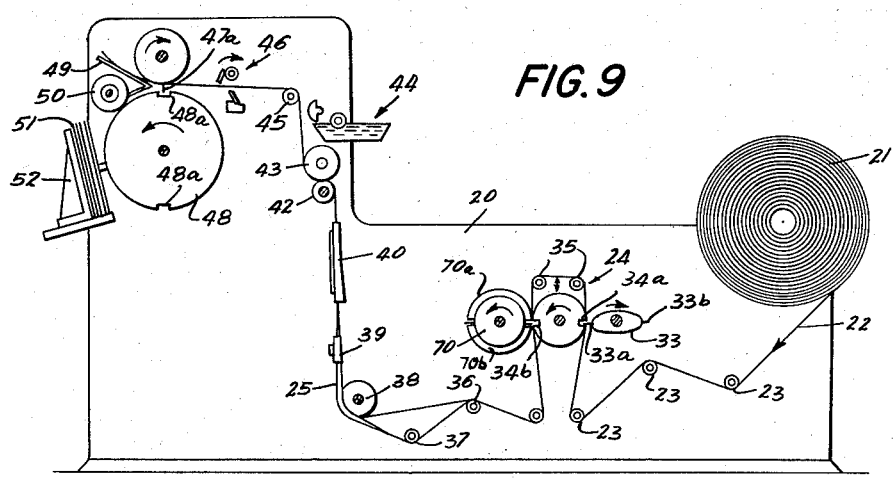
Fig. 9 is a diagrammatic showing of an apparatus according to the present invention for producing bags made of foldable material.
Figure 10:
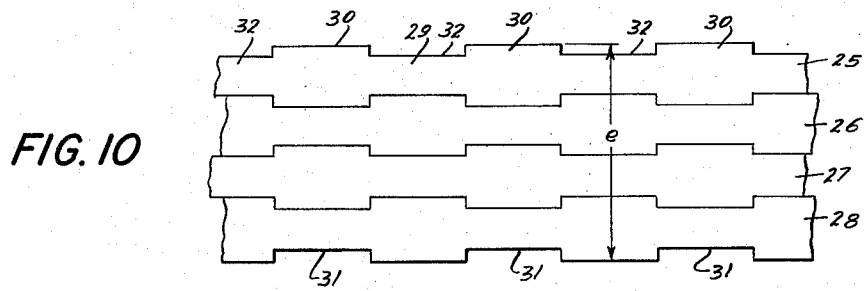
Fig. 10 is a composite strip divided into four individual strips from which bags may be produced in accordance with the present invention.
Figure 11:
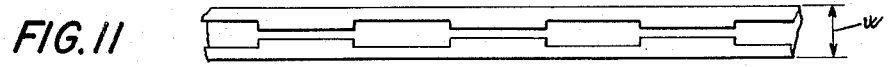
Figs. 11 and 12 show a single strip in different folded conditions.
Figure 12:
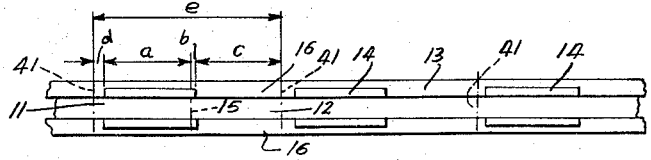

Fig. 9 is a diagrammatic showing of an apparatus capable of making any of the above-described bags and this figure, together with Figs. 10–12, illustrates a method by means of which the bags are produced. In Fig. 9, the support of the apparatus is indicated generally at 20, at the right hand portion of which, as viewed in the figure, there is a supply roll 21. The latter delivers a strip 22 the overall width of which is represented by $e$ (Fig. 10). This strip is guided over guide rollers 23 to a cutting arrangement indicated generally at 24 which cuts the strip into a number of individual strips, as, for example, into four strips 25, 26, 27, 28 as shown in Fig. 10. Each of these strips is composed of equally long alternate narrow and wide portions 29 and 30 which are so displaced relative to each other that there is no waste material between adjacent strips, the only waste occurring at 31 and 32 at the outer edges of the two outermost strips 25 and 28.

The cutting arrangement 24 which may be driven in any suitable manner, as, for example, by means of elliptical gears (not shown), includes a rotatable knife carrier 33 which carries two knives 33a and 33b which are displaced 180° from each other. The knives can be received within the slots 34a and 34b of a rotary platen 34 in such a manner as to produce the short transverse cuts. Semi-circular knives 70a and 70b are carried by a second rotatable knife carrier 70 and produce the longitudinal cuts. The knife carriers 33 and 70 and the platen 34 are rotated in the direction of the arrows so as to form the individual strips 25, 26, 27, 28, it being clear that the relative speeds and angular positions of the knife carriers and of the strip are so maintained that the strip delivered by the roll 21 is cut in the desired manner. Suitable guide rollers 35 which are mounted for movement in the direction of the arrows 35a are provided so that by raising or lowering these rollers, the spacing between the cutting points or areas at which the knives 34a, 34b and the knives 70a, 70b engage the strip may be varied and controlled.

Preferably, the knife carrier 33 is rotated at such speed that when the knives 33a, 33b engage and cut the strip, they move at substantially the same linear speed.

In this way, each individual strip is formed at its opposite edge portions with opposite elongated notches which leave between themselves opposite elongated flap portions equal in length to the notches.

While the notches and flaps are shown as being substantially rectangular in shape, the cutting arrangement 24 may impart a substantially trapezoidal shape to these notches and flaps, i.e., the short transverse cuts may form an angle with the length of the strips instead of being perpendicular thereto as illustrated in Fig. 10. In this way, a bag according to Fig. 8 may be produced.

From the cutting arrangement 24 the individual notched strips travel over a guide roller 36, and from there each strip moves beneath a separate guide roller 38. Thus, in the described embodiment, the apparatus includes four individual rollers 38 only one of which is shown, and the further treatment of only a single individual strip will be explained from here on, it being clear, however, that each of the individual strips is subjected to folding means, rollers, etc., similar to the type which will be described below.

In practice, it may be desirable to construct the apparatus in such a manner that the various elements which treat the individual strips are in alignment with each other. For this purpose, alternate strips—either the strips 25 and 27 or the strips 26 and 28—move beneath a roller 37, the spacing of which relative to the rollers 36 and 38 is so selected that these alternate strips, which, after having been created by the cutting arrangement 24, are linearly displaced relative to the other strips, are, by the time they move beneath the roller 38, in linear alignment with those strips which have moved directly from the roller 36 to their respective roller 38.

Each roller is narrower than the moving strip and has a width corresponding approximately to the width $w$ of the bag to be formed, so that by the time the particular notched strip the progress of which will be described further has moved upwardly past the roller 38, its edge portions are about perpendicular to the central portion of the strip. From the roller 38, the moving strip travels past a first folding means 39 which completes the folding of the notched edge portions of the strip onto one face thereof, so that the strip assumes the configuration shown in Fig. 11. (cf. Fig. 2).

The strip is then exposed to the action of a second folding means 40 which, in the direction of the moving strip, is behind the first folding means 39. This second folding means serves to fold the flaps of the notched strip back onto the previously folded edge portion, so that the strip assumes the configuration shown in Fig. 12 (cf. Fig. 3) in which the numerals 11 to 16 correspond to the elements of the finished bag, the numerals 41 indicating the lines along which the strip will be cut into individual sections of which individual bags are to be formed.

The strip then passes between two drive rollers 42 and 43 past an applicator device 44 where a suitable glue or other adhesive is applied to the exposed faces the folded flaps, or at least to that part of each flap which corresponds to the distance $a$.

The strip then moves past a separator device where it is cut along the lines 41 into individual sections, the lengths of which are shown by $l$. Each individual section is then folded along its transverse fold line 15 by means of a folding tool 47a carried by a rotatable tool carrier 47, the tool 47a being received within slots 48a of a second rotatable platen 48. In this way, the incoming section which first moves onto the plate 49 is engaged by the tool 47a and, in its folded condition, is caused to move between the pressing roller 50 and the platen 48. The flaps 14 are thus in face-to-face contact with and firmly pressed against that part of the edge portion of the section which is not coextensive with the particular flap portion, thus gluing these face-to-face portions together so as to form the seams of the bag.

The finished bags 51 are then stacked on a suitable rack 52.

Figure 13:
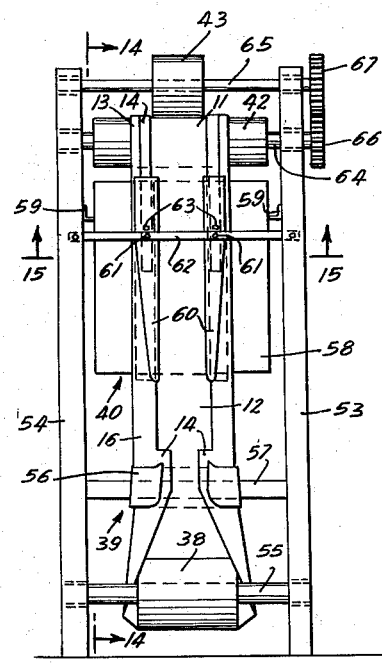
Fig. 13 is an elevational view showing details of part of the apparatus illustrated diagrammatically in Fig. 9.
Figure 14:
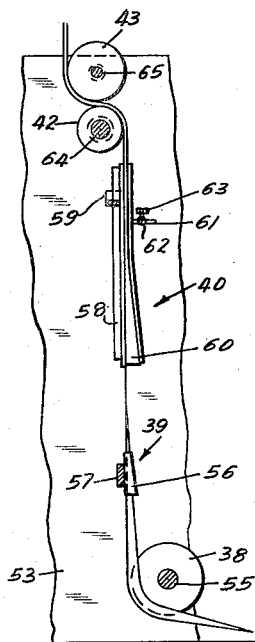
Fig. 14 is a side elevational view, partly in section, taken substantially along line 14—14 of Fig. 13.
Figure 15:
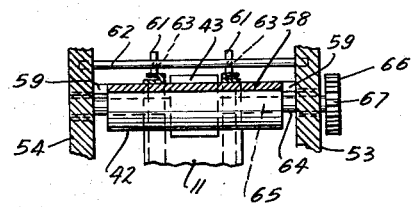
Fig. 15 is a sectional view taken substantially along line 15—15 of Fig. 13.

Figs. 13 to 15 illustrate the folding means 39 and 40 in more detail. These means include a common support frame having sides 53 and 54 which support the shaft 55 about which the roller 38 rotates.

The first folding means 39 includes a C-shaped folding element 56 which is carried by a cross-bar 57 that is secured to the sides 53 and 54, the element 56 being formed with two inwardly bent ear portions. The second folding means 40 includes a backing plate 58 which is secured to the sides 53 and 54, as, for example, by means of angle pieces 59. The actual folding members are arranged in front of the backing plate, and each includes a channel-shaped element 60 within which the flaps 14 of the moving strip are received and bent back upon the previously folded edge portions of the strip. A fastening pin 61 is secured to each of the channel-shaped members 60, which pin is received in a transverse bore of a mounting rod 62 the ends of which are attached to the sides 53 and 54. Suitable set screws 63 are provided for securing the pins 61 within their respective bores.

The drive rollers 42 and 43 are carried by shafts 64 and 65, respectively, which are rotatably supported by the sides 53 and 54. A suitable driving means, as, for example, meshing gears 66 and 67 non-rotatably secured to the shafts 64 and 65, respectively, are provided for rotating the driving rollers. The gears, in turn, can be driven in any suitable manner.

It will be understood that each of the elements described above, or two or more together, may also find a useful application in other types of methods and apparatuses for manufacturing bags differing from the types described above.

While the invention has been illustrated and described as embodied in a method and apparatus for manufacturing two-seam bags, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of making bags from an elongated strip of foldable material while such strips is moving in the direction of its length, the steps of providing the strip at its opposite edges with elongated notches which leave between themselves elongated flap portions approximately equal in length to said notches; folding the portions of said strip adjacent said opposite edges onto one face of said strip so as to form along said edges continuous notched folded-over edge portions; folding each of said flap portions back onto the previously folded corresponding edge portion; cutting the folded strip into individual sections each of which contains a pair of flap portions each of which extends from the region of one end of the respective section to approximately the midpoint thereof; and folding each section about a line transverse to said edge portions and passing through the region of the midpoint of each section and through said flap portions so that that part of each edge portion which is not coextensive with any flap portion is in face-to-face relationship with the flap portion associated with the remainder of such edge portion.

2. In a method of making bags from an elongated strip of foldable material while such strip is moving in the direction of its length, the steps of providing the strip at its opposite edges with opposite elongated notches which leave between themselves opposite elongated flap portions approximately equal in length to said notches; folding the portions of said strip adjacent said opposite edges onto one face of said strip so as to form along said edges continuous, notched folded-over edge portions; folding each of said flap portions back onto the previously folded corresponding edge portion; cutting the folded strip into individual sections each of which contains a pair of flap portions each of which extends from the region of one end of the respective section to approximately the midpoint thereof; and folding each section about a line transverse to said edge portions and passing through the region of the midpoint of each section and through said flap portions so that that part of each edge portion which is not coextensive with any flap portion is in face-to-face relationship with the flap portion associated with the remainder of such edge portion.

3. A method of making bags from an elongated strip of foldable material while such strip is moving in the direction of its length, comprising the steps of providing the strip at its opposite edges with elongated notches which leave between themselves elongated flap portions approximately equal in length to said notches; folding the portions of said strip adjacent said opposite edges onto one face of said strip so as to form along said edges continuous, notched folded-over edge portions; folding each of said flap portions back onto the previously folded corresponding edge portions; applying an adhesive to the exposed faces of the folded flap portions of the strip; cutting the folded strip into individual sections each of which contains a pair of flap portions each of which extends from the region of one end of the respective section to approximately the midpoint thereof; and folding each section about a line transverse to said edge portions and passing through the region of the midpoint of each section and through said flap portions so that that part of each edge portion which is not coextensive with any flap portion is in face-to-face relationship with and adheres to the flap portion associated with the remainder of such edge portion.

4. In an apparatus for making bags of foldable material, in combination, means for moving an elongated strip of foldable material along a predetermined work path; means for forming said strip at its opposite edge portions with notches which leave between themselves flap portions; first folding means arranged along said work path for folding the portions of said strip adjacent said opposite edges of the moving strip onto one face thereof so as to form along said edges continuous, notched folded-over edge portions; and second folding means also arranged along said work path and, in the direction of the moving strip, behind said first folding means for folding the flap portions of the moving strip back onto the previously folded corresponding edge portion of the strip.

References Cited in the file of this patent

UNITED STATES PATENTS

| | | |
|---|---|---|
| 1,030,655 | Ellis | June 25, 1912 |
| 2,033,994 | Mulligan | Mar. 17, 1936 |
| 2,090,308 | Potdevin | Aug. 17, 1937 |
| 2,511,031 | Yount | June 13, 1950 |

FOREIGN PATENTS

| | | |
|---|---|---|
| 867,948 | Germany | Feb. 23, 1953 |